Jan. 4, 1966  H. M. DEUTSCH  3,227,589
METHOD OF CHEMICALLY MILLING A METALLIC WORKPIECE
Filed June 12, 1963

INVENTOR.
HENRY M. DEUTSCH
BY
*Angus & Mow*
ATTORNEYS.

United States Patent Office 3,227,589
Patented Jan. 4, 1966

3,227,589
METHOD OF CHEMICALLY MILLING A METALLIC WORKPIECE
Henry M. Deutsch, Fullerton, Calif., assignor to Organo-Cerams, Inc., Anaheim, Calif., a corporation of California
Filed June 12, 1963, Ser. No. 287,432
10 Claims. (Cl. 156—13)

This invention relates to maskant fluids which upon drying or curing provide a peelable film for use in the chemical milling process, exemplified by Sanz Patent No. 2,739,047.

In the chemical milling process as generally practiced, aluminum workpieces are first cleaned, dried and coated with several coatings of a maskant material. The maskant is dried, or cured, to provide a resilient peelable coating that is resistant to the solutions employed in the process. After cure of the maskant, the coated part is then scribed with a sharp knife sufficiently to cut through the maskant film. In these selected areas the maskant is peeled off the workpiece which is then subjected to an etchant for a period of time necessary to etch the exposed metal areas to a desired amount. When all etching has been accomplished the rest of the maskant is peeled from the workpiece and the process is complete.

This invention also relates to a novel process for use in the art of chemical milling. The chemical milling has a great potential because of results which can readily be obtained with it that are practically unattainable with the use of conventional milling machine processes. One example of this potential is the formation of depressions of irregular perimeter and uniform or stepped depth in complex curved or warped surfaces. Such depressions cannot, as a practical matter, be machined. They can, however, readily be made by chemical milling.

It is evident from the foregoing that the properties of the maskant are critical to an effective use of processes wherein action is to be restricted only to unmasked areas. Particularly in chemical milling, optimum results in commercial operations have yet not been attainable because of shortcomings of known maskants. It is an object of this invention to provide maskants which will overcome these shortcomings and make chemical milling, practical and optimally efficent, even in small shops.

A principal problem which is inherent in presently known maskants is that they have generally been opaque, and often have been colored black. The problems inherent in these maskants are that scribe lines in them cannot readily be found once they are cut, and also that any imperfections in the maskant layer cannot be detected until after the part has been entirely processed. By that time, the part may be ruined by undesired action hidden from view by the maskant.

Chemical milling is customarily accomplished in large rooms which are only moderately illuminated. After the maskant has been applied, dried or cured to form a tough resilient peelable protective film, a scribe template or tool is superimposed over the coated workpiece. The pattern to be etched is then scribed with a knife. Knowledge of the exact location of scribe lines is, of course, essential for when the scribe template or tool is removed, some scribe lines must be joined for bridging in the tool or template is necessary to give these tools strength, rigidity and accuracy. Such knowledge also greatly simplifies peeling of the intended areas then or at a subsequent time if differential etching is to be accomplished. However, when the cut edges of the maskant film spring back together, and particularly when the maskant is black, the lack of any contrast at the line renders finding it by reasonably quick observation a near impossibility. Surely it is a most inefficient operation. In fact, many times the marked part is cleaned, dried, and rubbed with talc in an effort to get line contrast. Also, it is not uncommon for secondary patterns such as crayon lines to be placed on the maskant layer to aid in locating the scribe lines.

As to detecting flaws in the maskant layer, it is evident that should the maskant be opaque, it is not possible to observe the condition of the surface being etched. Maskants are generally applied to a workpiece in liquid form and then cured. The liquid is flooded onto the workpiece, where a film adheres which is either self-curing, or which is cured by heating it. It is obvious that bubbles or other flaws may form in a film created in this manner which would permit etchant to seep down to the workpiece in an area where etching is not desired, and thereby spoil the part. Another flaw could be caused by a rough-cutting knife which removes part of the maskant layer at the edges of the cut, in a region not intended to be etched at the start of the process. Such a small flaw in the maskant layer would hardly be visually noticeable to any commercially practicable standards, but it could permit etchant to reach the workpiece. In the etching of aluminum with sodium hydroxide, the surface being etched is black, but this would be hidden by an opaque or dark maskant. Were regions being etched where etching is not desired, then the process could be interrupted, and the maskant layer could be repaired if the flaw could be detected in time. This is obviously impossible when opague maskants are used. However, were the maskant at least translucent, then imperfections could readily be observed by noting the spread of color beneath the maskant. The process could then be interrupted, and the maskant repaired before serious damage is done.

A maskant fluid according to this invention forms a film resistant to the process being used to treat a metal surface in the sense that it will protect the surface from being treated by the process. The film has the properties of adherence to the workpiece, and of changing its condition of visibility in regions that have been stressed as a consequence of mechanical stress exerted on it in those regions when in a cured-film condition. Furthermore, instead of being degraded by the process in which it is immersed it may be cured and actually rendered mechanically more reliable.

According to a preferred but optional feature of the invention, the maskant fluid is applied to a workpiece surface where it is formed into a self-supporting mask. The mask has a first condition of visibility in its undisturbed condition, and after having been cut, has a second condition of visibility at the boundary of the incision, the second condition being more evident under illumination than the first condition.

According to still another preferred but optional feature of the invention, the matrix is inherently translucent in its first condition, thereby rendering visible the chemical action, if any, which occurs beneath the maskant layer in the chemical milling process.

The above and other features of this invention will be fully understood from the following detailed description and the accompanying drawings in which:

FIG. 1 illustrates a workpiece 10 bearing a cured layer (or film) 11 of maskant according to the invention. The set-up shown can be used for chemical milling in its best known sense: the treatment of aluminum workpieces in hot caustic solutions.

Figure 1:
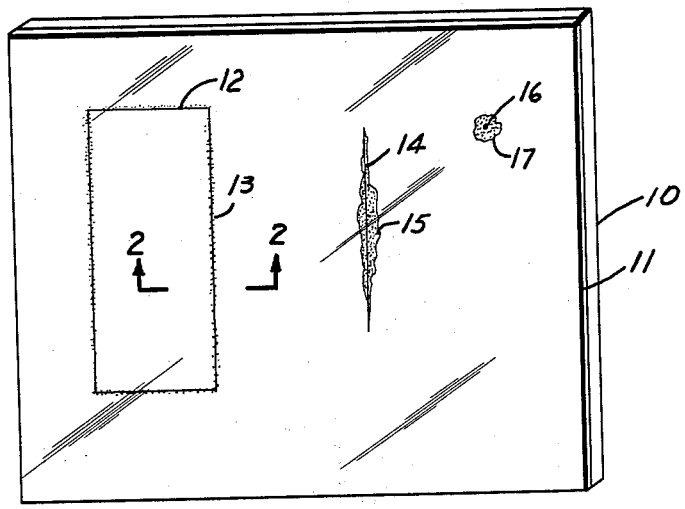
FIG. 1 is a plan view of a workpiece to be chemically milled, or otherwise surface-treated, and which carries a layer of maskant according to the invention.
Figure 2:
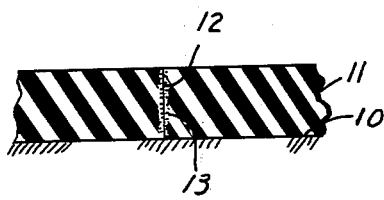
FIG. 2 is a fragmentary cross-section taken at line 2—2 of FIG. 1.

A quadrilateral scribed pattern 12 has been cut through layer 11. The dotted portion 13 adjacent to the scribe line indicates a region of different visibility and usually a different color as well as contrasted with the unstressed regions of the film. In the undotted region of layer 11, the matrix is in its first condition. Where the dotted portion is shown, which is a region where mechanical stress was exerted on the film, in this case a knife cut, the matrix is in its second condition. Another scribe line 14 is shown cut through the maskant with a discolored region 15 lying immediately below it. This discoloration is on the surface of the workpiece. A flaw 16, perhaps a bubble or pin hole, is also shown with a discolored region 17 beneath it. The quadrilateral pattern might define a region to be etched, and the maskant within that line would be removed by stripping it off.

In the process of chemical milling, a film-forming maskant material is ordinarily flowed onto the surface in liquid form where it is set up in the form of a tough, resilient film either by self-curing, or by air or heat-curing, to form an unconfined homogeneous film contiguous and adherent to the surface of the workpiece. The maskant is scribed by cutting through it with a knife down to the surface of the workpiece, and then the maskant is stripped away from the surface where etching is to take place. Then the entire workpiece is subjected to the action of the etchant (sometimes called "etching material"), the maskant serving to resist its action in localized regions.

Where the maskant layer is contiguous, continuous, adherent and without flaws, it will completely protect the workpiece. However, often additional scribe lines which may form part of the boundary of a region later to be etched but to a lesser depth may be cut such as scribe line 14. Theoretically, the maskant should reseal itself, inasmuch as no material is removed when the scribe line is cut. However, as a practical matter, occasionally some irregularity of cut, or some material removal does occur, and it is possible for etchant to seep through at such imperfections. The same would be true at a region such as a flaw 16 which might be a pin hole or other puncture, bubble, or other flaw such as a deep abrasion, the size of which is substantially undetectable to the naked eye. This is particularly true under the relatively poor illumination which commonly exists in most chemical milling establishments.

Furthermore, with an opaque maskant layer, the attack of the etchant in undesired locations cannot be detected. However, if the material of the maskant is translucent, then discolored regions such as regions 15 and 16 will be visible through the layer, particularly when the reaction products of the process are dark as in the case of sodium hydroxide attacking aluminum alloys. If the discolored region can be seen beneath a translucent maskant layer in time, then the faulty area can be cut out and replaced by a spot-patching operation before the workpiece is spoiled. In previously known maskants which were opaque, this advantage was not available and the spoilage of the workpiece was not discovered until the workpiece was substantially completed, thereby wasting all of the material, and all of the time and reagents, used for completely processing the product which turned out to be scrap. This unfortunate consequence is avoided by the present invention.

The visibility of the scribe line is obtained by a differential effect obtained by utilizing a maskant matrix which is inherently translucent, and which has a first condition of visibility in its initially cured condition (hereinafter called "first condition"), and which has a different index of refraction at regions where it has been mechanically stressed so that its structure is reoriented. Examples of such stresses are cutting, abrasion, and punching.

Maskants for use herewith are selected from the group of rubbery polymers having the capability of forming a high tensile strength, continuous film adherent on a workpiece to be treated, which are resistant to the action of materials intended to be used in the process, such as etchant, and which can readily be processed to form a viscous fluid that can be spread onto a workpiece. Some examples are SBR Styrene butadiene, which is sold as S1500 or SBR 1012 by Shell Chemical Company. Other suitable rubbery polymers are Chloroprene and Acrylonitrile butadiene copolymer. These rubbery polymers are not the only ones which can be utilized with this invention but are illustrative of the general group of rubbery polymers which have the aforementioned physical properties.

The above rubbery polymers, in cured film form, are inherently translucent and will, on being cut, abraded or otherwise disturbed, undergo a reorientation of their molecular arrangement as a result of the mechanical stress. However, a film of pure rubbery polymer generally will not show a contrast between an undisturbed and mechanically stressed portion. This invention provides means whereby regions that have been mechanically stressed can be rendered visible. The location where the mechanical stress took place becomes even more noticeable in that event. For example, a change of color is noticeable adjacent to the incision after the layer (or film) is cut, and this is sometimes referred to as a second condition of visibility, which is more evident under illumination than the layer in its first condition of visibility (when it is undisturbed), as in dotted portion 13 of the figs.

The design criteria to secure the objectives of this invention reside in the proper selection of matrix and fillers therefor. If $n_r$ is the refractive index of the matrix, and $n_p$ is the refractive index of the additives when contacted by the matrix material, it will be found that the system is translucent when $\Delta n$, which is defined as $n_p - n_r$ is less than 0.5, and that the system tends too far toward the opaque if $\Delta n$ is greater than 0.5.

Examples of maskant material suitable for use in this invention are as follows:

*Example I*

| | Parts by weight |
|---|---|
| SBR 1012 | 100 |
| Calcium silicate precipitated hydrous | 30 |
| Fibrous magnesium silicate | 50 |
| Hard clay-Dixie (aluminum silicate) | 50 |
| Stearic acid | 2 |
| Zinc oxide | 5 |
| Sulphur, rubber grade | 1.5 |
| MBTS (Mercapto benzo thiazole disulphide) | 2 |
| Diphenyl guanidine | 0.5 |
| Resin-phenolic, thermo setting type, Durez 13355; made by Hooker Electro Chemical | 25 |

Toluene to form a solution containing 25% by weight of the above.

*Example II*

| | |
|---|---|
| Solid chloroprene elastomer | 100 |
| Calcium silicate precipitated hydrous | 20 |
| Fibrous magnesium silicate | 50 |
| Hard clay-Dixie (aluminum silicate) | 30 |
| Zinc oxide | 5 |
| Magnesium oxide | 2 |
| Anti-oxidant such as hindered phenol | 2 |
| Accelerator (NA–22; 2-mercapto imidazoline) | 1 |
| Resin-phenolic, thermo setting type, or mixture of thermo setting and thermo plastic type such as Super Beckacite #1001 or 1051 made by Reicholz Chemical Co., White Plains, New York); or Durez 12687 made by Hooker Electro Chemical | 25 |

Toluene or a blend of toluene and methyl-ethyl ketone (MEK) to form a solution containing 30% by weight of the above.

*Example III*

| | Parts by weight |
|---|---|
| Acrylonitrile butadiene copolymer (30% acrylonitrile-65% butadiene) | 100 |
| Calcium silicate precipitated hydrous | 10 |
| Hard clay-Dixie (aluminum silicate) | 50 |
| Zinc oxide | 5 |
| Sulphur, rubber grade | 1.5 |
| Super accelerator such as polyamines or carbamates, for example, Accelerator 833, which is an aldehyde amine sold by Du Pont, or zinc dibutylcarbamate | 1.5 |
| Chlorinated rubber resin (such as Parlon, 20 cps., made by Hercules Powder) | 25 |

Methyl ethyl ketone (MEK) or a blend of methyl ethyl ketone and toluene to form a solution containing 25% by weight of the above.

All examples may be air cured if to their formulation there is added a super accelerator (sometimes called an "ultra accelerator"). Super accelerators are well known. The term includes as preferred examples polyamines, and carbamates, specific ones of which are given in Example III. Example III includes such a super accelerator, and is self-curable at room temperatures because of it.

In the above three examples, the rubbery polymer and all the additives and fillers are milled on a rubber mill to a smooth sheet of uniform properties which is cut into small pieces and dissolved in toluene or other suitable organic solvent, which after application to the workpiece is permitted to evaporate. The maskants of all examples are curable at approximately 225–300° F. However, with the addition of a super accelerator, such as in Example III, the formulation is self-curing at room temperatures.

In the above examples, the fillers are for purposes of pigmentation—that is, to make a stressed region visible, are calcium silicate, magnesium silicate and aluminum silicate. In Example I, the stearic acid, zinc oxide, sulphur and mercapto benzo thiazole disulphide, and diphenyl guanidine are provided as additives to aid in the curing process as is the accelerator in Example II. In Example III, a polyamine or carbamate, for example, Accelerator 833, which is an aldehyde amine sold by Du Pont, or zinc dibutylcarbamate, is provided as a super accelerator to render the maskant self-curing.

The resin in all the embodiments is provided for the purpose of film reinforcement and for aiding specific adhesion to metal surfaces. The term "additive" is intended to relate to the curing agents that aid in forming the film when such are used. The terms "curing" and "drying" are used interchangeably to define the formation of a film, without being restricted to, or necessarily involving, any chemical reaction.

The term "matrix" is intended to define the self-supporting film (and the material from which it was formed) in which the mineral filler or fillers is dispersed, and thus includes the entire composition less the mineral filler or fillers. When the maskant layer has been cured in place, all of the above embodiments are formed as a translucent film of thickness which depends on such parameters as viscosity, curing temperatures, and the like. The proper thickness is initially determined by experimentation, and is readily maintained thereafter. Even pencil writing can be seen through contiguous layers of the thickness used herein, which will ordinarily be between $1/64$ and $1/16$ inch thick, although the greater or lesser thickness can be used.

This invention is not to be limited by the embodiments shown in the drawings and described in the description which are given by way of example and not of limitation, but only in accordance with the scope of the appended claims.

I claim:

1. A method of chemically milling a metallic workpiece comprising:
    (a) applying to the surface of said workpiece a curable maskant composition comprising a matrix, which matrix comprises a rubbery polymer, and a mineral filler wherein, in the cured condition of the polymer the refractive indices of the matrix and of the filler differ by less than about 0.5 units;
    (b) curing said maskant to form a self-supporting, continuous, peelable, homogeneous, translucent mask which is adherent to and contiguous with the surface of the workpiece, said mask also being resistant to chemical milling solutions;
    (c) scribing a design in the mask;
    (d) peeling from the workpiece surface the area of the mask forming the scoibed design to provide an exposed portion of the workpiece; and
    (e) subjecting said exposed portion to a chemical milling solution.

2. A method according to claim 1 in which the polymer is polychloroprene, a butadiene-styrene copolymer, or a butadiene-acrylonitrile copolymer, and in which the filler is an inorganic silicate.

3. A method according to claim 1 in which the metallic surface of the workpiece to be chemically milled is aluminum or an aluminum alloy, and in which the chemical milling solution is sodium hydroxide.

4. A method of chemically milling a metallic workpiece, comprising:
    (a) applying to the surface of said workpiece a curable maskant composition comprising a matrix, which matrix comprises a rubbery polymer, and a mineral filler, in the cured condition of which a layer of said maskant has a first condition of visibility in an undisturbed condition, and after having been cut, having a second condition of visibility at the boundary of the incision, the second condition being more evident under illumination than the first condition;
    (b) curing said maskant to form a self-supporting, continuous, peelable, homogeneous, translucent mask which is adherent to and contiguous with the surface of the workpiece, said mask also being resistant to chemical milling solutions;
    (c) scribing a design in the mask;
    (d) peeling from the workpiece surface the area of the mask forming the scribed design to provide an exposed portion of the workpiece; and
    (e) subjecting said exposed portion to a chemical milling solution.

5. A method according to claim 4 in which the polymer is polychloroprene, a butadiene-styrene copolymer, or a butadiene-acrylonitrile copolymer, and in which the filler is an inorganic silicate.

6. A method according to claim 4 in which the metallic surface of the workpiece to be chemically milled is aluminum or an aluminum alloy, and in which the chemical milling solution is sodium hydroxide.

7. A method of chemically milling a metallic workpiece, comprising:
    (a) applying to the surface of said workpiece a liquid maskant composition comprising a matrix, which matrix comprises a rubbery polymer, a mineral filler, and a volatile solvent;
    (b) evaporating said volatile solvent to form a self-supporting, continuous, peelable, homogeneous, translucent mask which is adherent to and contiguous with the surface of the workpiece, said mask also being resistant to chemical milling solutions, said mask in its self-supporting condition having a first condition of visibility in an undisturbed condition, and after having been cut, having a second condition of visibility at the boundary of the incision, the second condition being more evident under illumination than the first condition;
    (c) scribing a design in the mask;

(d) peeling from the workpiece surface the area of the mask forming the scribed design to provide an exposed portion of the workpiece; and (e) subjecting said exposed portion to a chemical milling solution.

8. A method according to claim 7 in which the volatile solvent is an organic solvent.

9. A method according to claim 8 in which the polymer is polychloroprene, a butadiene-styrene copolymer, or a butadiene-acrylonitrile copolymer and in which the filler is an inorganic silicate.

10. A method according to claim 8 in which the metallic surface of the workpiece to be chemically milled is aluminum or an aluminum alloy, and in which the chemical milling solution is sodium hydroxide.

References Cited by the Examiner

UNITED STATES PATENTS

| 2,430,987 | 11/1947 | Lindner et al. | 260—33.6 |
| 2,610,162 | 9/1952 | Hoffman | 260—33.6 |
| 2,838,463 | 6/1958 | Freeman | 260—3.5 |
| 3,014,883 | 12/1961 | Wolf | 260—41.5 |
| 3,029,223 | 4/1962 | Hibbard | 260—879 |
| 3,079,352 | 2/1963 | Atkins et al. | 260—3.5 |
| 3,128,202 | 4/1964 | Schilling | 117—122 |

MURRAY TILLMAN, *Primary Examiner.*

SAMUEL H. BLECH, *Examiner.*

G. F. LESMES, *Assistant Examiner.*